(12) United States Patent
Ono (10) Patent No.: US 8,120,506 B2
(45) Date of Patent: Feb. 21, 2012

(54) DISPLAY UNIT HAVING A DIAL AND A CENTRAL DISPLAY

(75) Inventor: Haruyoshi Ono, Shimada (JP)

(73) Assignee: Yazaki Corporation, Tokyo (JP)

( * ) Notice: Subject to any disclaimer, the term of this patent is extended or adjusted under 35 U.S.C. 154(b) by 407 days.

(21) Appl. No.: 12/458,374

(22) Filed: Jul. 9, 2009

(65) Prior Publication Data

US 2010/0007509 A1    Jan. 14, 2010

(30) Foreign Application Priority Data

Jul. 9, 2008    (JP) .................................. 2008-178769

(51) Int. Cl.
*G08B 5/24* (2006.01)

(52) U.S. Cl. ........... 340/815.78; 340/815.4; 340/815.42; 116/300

(58) Field of Classification Search ............. 340/815.78, 340/815.4, 815.42; 116/300
See application file for complete search history.

(56) References Cited

U.S. PATENT DOCUMENTS

| | | | |
|---|---|---|---|
| 4,404,522 A * | 9/1983 | Pucciarello ................... | 324/114 |
| 5,050,045 A | 9/1991 | Kato et al. | |
| 5,211,128 A | 5/1993 | Katoh et al. | |
| 6,682,201 B2 | 1/2004 | Kneer et al. | |
| 2005/0109261 A1 | 5/2005 | Tanaka et al. | |
| 2006/0219155 A1 | 10/2006 | Honma et al. | |
| 2007/0126567 A1 | 6/2007 | Fournier et al. | |
| 2009/0078191 A1 | 3/2009 | Ikarashi | |
| 2010/0326347 A1 | 12/2010 | Mayer | |

FOREIGN PATENT DOCUMENTS

| | | |
|---|---|---|
| DE | 19534020 A1 | 3/1997 |
| DE | 19617498 A1 | 11/1997 |
| DE | 10064759 A1 | 7/2002 |
| DE | 10324214 A1 | 12/2004 |
| DE | 102007039327 A1 | 8/2008 |
| DE | 102009037027 A1 | 2/2011 |
| EP | 2048479 A1 | 4/2009 |
| GB | 2457071 A | 8/2009 |
| JP | 04070514 A | 3/1992 |
| JP | 2005-181301 | 7/2005 |

OTHER PUBLICATIONS

Official Communication for German Patent Application 102009031682.5 issued Sep. 19, 2011.

* cited by examiner

*Primary Examiner* — Travis Hunnings
(74) *Attorney, Agent, or Firm* — Edwards Wildman Palmer LLP (57) ABSTRACT

Provided is a display unit that incorporates a dial, a central display device, and an indicating needle. The indicating needle includes a substrate provided beneath the display device, a light source on a surface of an end of the substrate; and a light guide. The light guide includes a first light-guide portion extending vertically with its lower end facing the light source of the substrate, a second light-guide portion extending horizontally from the first light-guide portion, a third light-guide portion extending vertically from the second light-guide portion, and a needle portion extending horizontally such that the dial is pointed to by the end of the needle portion. The display unit may include a light-guide cover that prevents leakage of light and a regulation portion that restricts undesirable movement of a lead wire which might obstruct with rotation of the indicating needle.

8 Claims, 4 Drawing Sheets

DISPLAY UNIT HAVING A DIAL AND A CENTRAL DISPLAY

CROSS-REFERENCE TO RELATED APPLICATION

The priority application Japan Patent Application No. 2008-178769 upon which this patent application is based is hereby incorporated by reference.

BACKGROUND OF THE INVENTION

1. Field of the Invention

The present invention relates generally to a display unit for an automobile or other vehicle, and more particularly to a display unit incorporating a dial of a revolution indicator such as a tachometer and a speedometer and a display device such as an LCD unit arranged at the center of the dial.

2. Description of the Related Art

A dial of a revolution indicator and a display device arranged on the surface of the dial are commonly used in a known display unit of an automobile or other vehicle. Such design is most often intended to ensure good visibility of the display device regardless of the presence of an indicating needle that points to a scale of the dial and while allowing the display device to be arranged at the center of the dial.

In a case where the dial is designed to indicate important content of information such as a vehicle speed while the display device indicates less important information such as current time, there is a need to improve such arrangement of the dial. More specifically, raising the dial relative to the central display device allows the dial to be closer to an eye point of a driver than the central display device, and thus improves the visibility of the dial.

Figure 4:
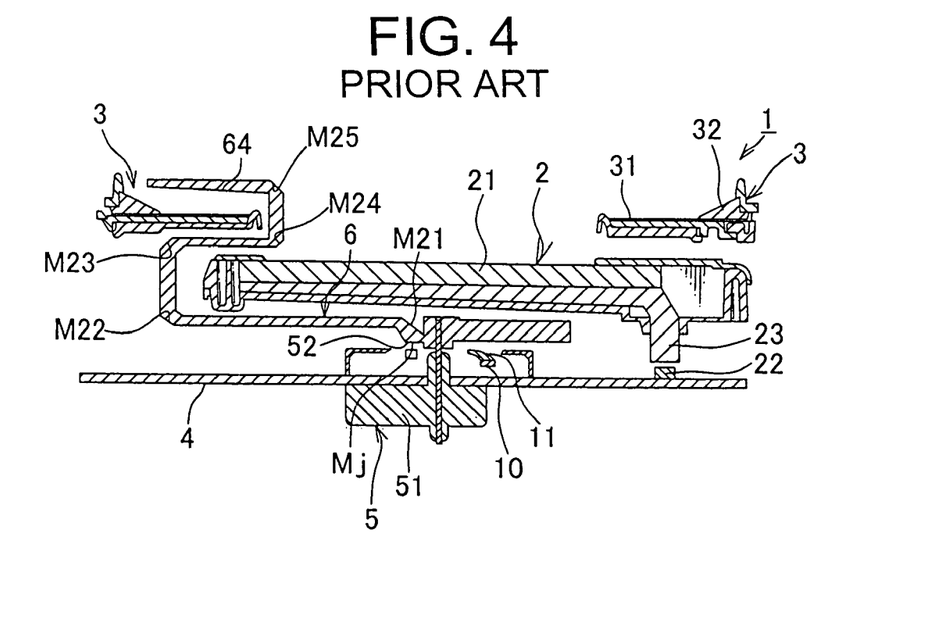
FIG. 4 is a cross-sectional view of a conventional display unit.
Figure 5:
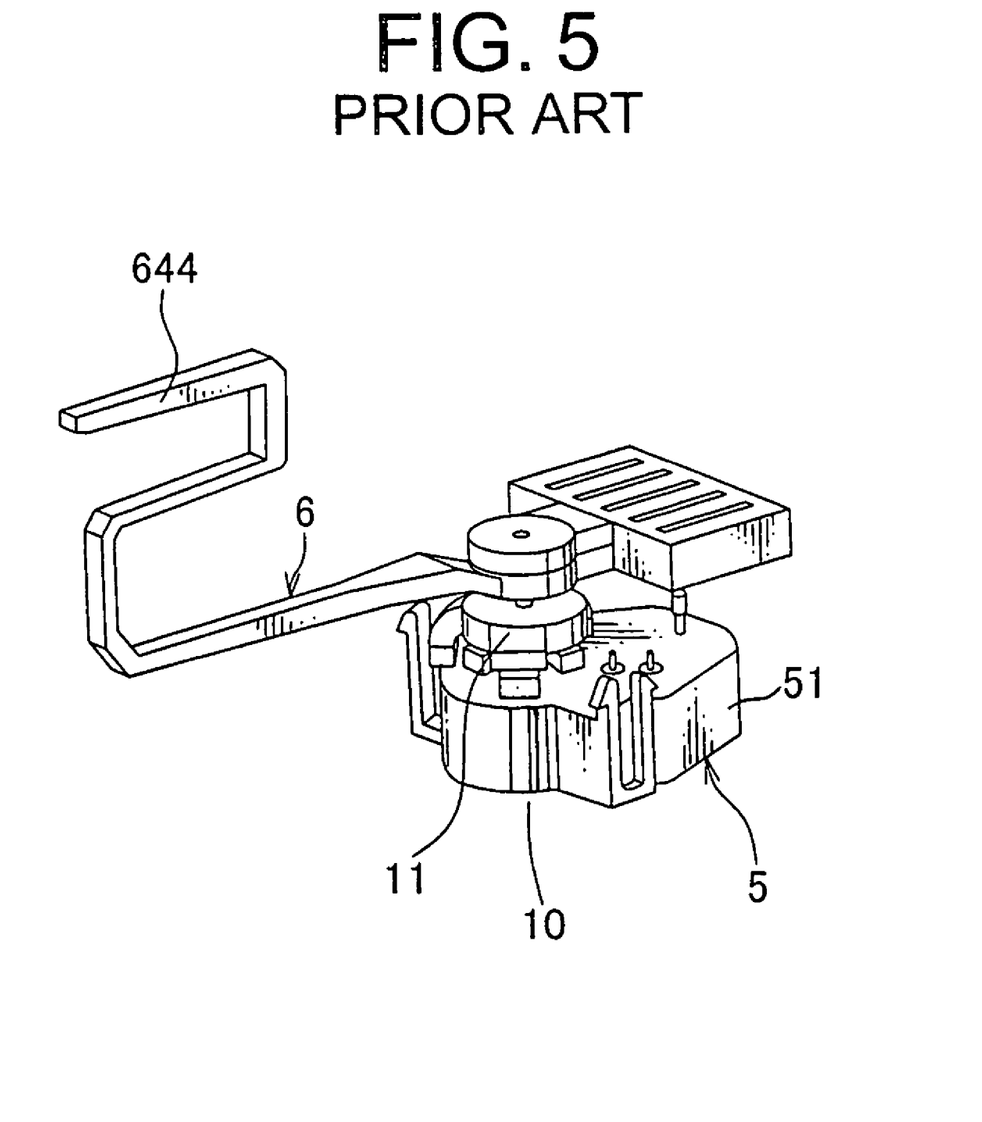
FIG. 5 is a perspective view illustrating an indicating needle, a prism, an LED light source, a motor and a balance weight of the conventional display unit shown in FIG. 4.

In view of such requirement, there exists a known display unit as shown in FIGS. 4 and 5 (see for example Japanese Patent Application Laid-Open Publication No. 2005-181301). As shown in FIGS. 4 and 5, a display unit 1 includes a liquid crystal display (LCD) 2 as a display device, a dial assembly 3, a main board 4, a motor 5, an indicating needle 6, an LED light source 10, and a prism 11. The LCD device 2 is substantially circular when viewed from the eye point of the driver, and information such as warning and current time is indicated on the LCD device 2. The LCD device 2 includes a body 21, an LED light source 22 for backlighting provided on the main board 4, and a light-guiding plate 23 that guides a light beam emitted by the LED light source 22 toward an underside of the body 21.

The dial assembly 3 takes a shape of a ring (or an arc) when viewed en face by a driver, with a substantially circular hole being provided at its center. Scales and numerals are formed on the periphery of the dial assembly 3. The dial assembly 3 is provided on the front side of the LCD device 2 such that the LCD device 2 can be viewed by the driver via the hole.

The main board 4 is provided below the LCD device 2. The motor 5 has a body 51 provided on an underside of the main board 4. The motor 5 has a shaft 52 protruding on a front surface of the main board 4.

One end of the indicating needle 6 is secured to the shaft 52. The indicating needle 6 horizontally extends from the shaft 52 along the underside of the LCD device 2, bends at a right angle and vertically extends past the edge of the LCD device 2, again bends at a right angle to extend in a space between the LCD device 2 and the dial assembly 3, further bends at a right angle to vertically extend past the inner edge of the dial assembly 3, and again bends at a right angle to extend horizontally with the other end (i.e., needle portion 64) of the indicating needle 6 is positioned on the front surface of the dial assembly 3 so that the indicating needle 6 does not obstruct a line of sight between the eye point of the driver and a display area of the LCD device 2. The above-described configuration of the indicating needle 6 allows the LCD device 2 to be viewed by the driver regardless of the basin-like arrangement of the LCD device 2 with respect to the surface of the dial assembly 3. The indicating needle 6 is a light-emitting needle made of a light-guide material such as transparent synthetic resin.

A plurality of the LED light sources 10 are provided on the front surface of the main board 4 such that the shaft 52 of the motor 5 is surrounded by the LED light sources 10. The prism 11 is provided between the LED light sources 10 and a light-entrance surface Mj of the indicating needle 6. The prism 11 is used to concentrate the light beams emitted by the LED light sources 10 to let the concentrated light beams enter the light-entrance surface Mj of the indicating needle 6. The light beams that entered the light-entrance surface Mj undergo five times of reflection by reflecting surfaces M21 to M25 in order of appearance (see FIG. 4) before reaching the needle portion 644. The light beams that entered the needle portion 644 are further reflected off a back surface of the needle portion 644 and then exit a front surface thereof. In this manner, the needle portion 644 is seen to emit light.

A drawback of the conventional display unit 1 is that it is necessary to arrange the plurality of LED light sources 10 around the shaft 52 in order to make the indicating needle 6 emit light, making it difficult to eliminate the irregular luminescence of the indicating needle 6 due to turning of the indicating needle. In the conventional display unit 1, the light beams emitted by the LED light sources 10 are concentrated using the prism 11 and enter the light-entrance surface Mj of the indicating needle 6 to increase brightness of the needle portion 644. This configuration introduces irregularity in luminescence during turning when there is not sufficient distance between the LED light source 10 and the light-entrance surface Mj lo of the indicating needle 6.

Apart from the problem of the needle's irregular luminescence, the conventional display unit 1 has another problem. Since a light beam emitted by the LED light source 10 travels via the five reflecting surfaces M21 to M25 before reaching the needle portion 644, multiple times of reflection causes considerable attenuation of light beams, making it difficult to obtain sufficient level of brightness or luminance of the needle portion 644.

Thus, the times of reflection of light beams inside of the indicating needle should be reduced. Also, it is preferable that leakage of light from surfaces of the indicating needle other than the top surface of the needle portion is effectively prevented. Further, if a structure designed to overcome the above-identified drawbacks is to be incorporated, it is appreciated that side effect or disadvantage caused by such a newly introduced structure should also be eliminated or minimized.

In view of the foregoing, it can be seen that a solution is needed which addresses these uneven and insufficient brightness issues so as to enable a manufacturer to provide improved functionality and appearance quality of in-vehicle display devices.

SUMMARY OF THE INVENTION

To address the above-identified problems, the present invention is to provide a display unit that reduces irregularity in brightness of an indicating needle and increases brightness of the indicating needle.

Provided is a display unit that includes a doughnut-shaped dial having a substantially circular hole at the center thereof, a circular display device provided beneath the dial, a front surface of the display device being exposed to an outside via the hole of the dial with marginal area of the front surface covered by the dial; and an indicating needle that turns about a shaft provided beneath the display device.

The indicating needle includes (a) an elongated substrate that extends beneath the display device in a radial direction with respect to the shaft, with one end secured to the shaft and with the other end reaching a space more outward in the radial direction than an edge of the display device, (b) a light source provided on a portion of the substrate, the portion being more outward in the radial direction than the edge of the display device; and (c) a light guide whose geometry according to one embodiment of the present invention is as follows.

The light guide includes (i) a first light-guide portion extending upward in an axial direction with respect to the shaft, past the edge of the display device, with one end facing a surface of the light source and with the other end reaching a space higher in the axial direction than the display device, (ii) a second light-guide portion extending inward in the radial direction with one end thereof continuing to the other end of the first light-guide portion and the other end thereof residing above the display unit and more inward in the radial direction than an inner periphery of the dial, (iii) a third light-guide portion extending upward in the axial direction with one end thereof continuing to the second light-guide portion and with the other end thereof reaching a space higher than the dial; and (iv) a needle portion extending outward in the radial direction with one end thereof continuing to the other end of the third light-guide portion and the other end thereof residing above the dial so that the dial is pointed to by the other end of the needle portion.

With the construction and arrangement described above, an advantage of the invention is that, by virtue of the light source mounted on the tip of the elongated substrate secured to the shaft, the light source is turned in synchronization with turning of the indicating needle, and thus the irregularity in luminance of the needle portion while turning can be eliminated.

In one implementation, a film may be provided on side surfaces of the substrate for prevention of thermal deformation of the substrate.

Preferably, the light guide includes (a) a first reflecting surface provided at a connecting portion between the first light-guide portion and the second light-guide portion such that a light emitted by the light source and traveling inside of the first light-guide portion is reflected off the first reflecting surface and the reflected light further travels inside of the second light-guide portion, (b) a second reflecting surface provided at a connecting portion between the second light-guide portion and the third light-guide portion such that the light traveling inside of the second light-guide portion is reflected off the second reflecting surface and the reflected light further travels inside of the third light-guide portion, and (c) a third reflecting surface provided at a connecting portion between the third light-guide portion and the needle portion such that the light traveling inside of the third light-guide portion is reflected off the third reflecting surface and the reflected light further travels inside of the needle portion toward the other end of the needle portion.

With the construction and arrangement described above, the number of times of reflection during turning of the indicating needle 6 can be reduced from conventional five (5) to three (3), and thus the brightness of illumination of the needle portion 644 can be increased.

Preferably, the light guide may include in one piece therewith a fixing member including a pair of nails each provided on an underside of the first light-guide portion in the axial direction so as to sandwich the both edges of the substrate in the width direction, and a slide grooves into which the both edges of the substrate are slidably inserted, the slide grooves being formed on inner surfaces of the pair of nails. It is appreciated that the light guide can be readily attached to the substrate by just inserting the both edges of the substrate in the slide grooves and sliding the light guide.

Preferably, the display unit may include a light-guide cover. The light cover is configured to cover the outer surfaces of the light guide except for a top surface of the needle portion so as to prevent leakage of light. Since the light-guide cover prevents a light from exiting surfaces other than the top surface of the needle portion, the light-guide cover contributes to improved quality of appearance of the indicating needle.

Preferably, the light-guide cover includes a white body made of a white material and a black coating provided on the outer surface of the white body. An advantage of the light-guide cover having the white body is that the light that may leak out of the light-guide cover is reflected off the white body and the reflected light is again guided through the light guide 64 to the needle portion 644, and thus the brightness of luminescence of the needle portion is further improved. Also, by virtue of the white body of the cover, brightness of luminescence on the top surface of the needle portion can be further improved. At the same time, by virtue of the black outer surface, the light that may pass the white body of the light-guide cover to an outside is absorbed by the black surface, and thus the leakage of light is effectively prevented.

Preferably, the display unit may include a main board beneath the substrate of the indicating needle and a lead wire for power supply that is connected between the main board and the substrate. By virtue of the lead wire, power can be supplied from the main board to the substrate without being affected by rotation and a rotation angle of the substrate.

Preferably, the display unit may include a regulation portion. The regulation portion is provided beneath the underside of the substrate of the indicating needle and on the upper surface of the main board, and is configured to sandwich the lead wire in the axial direction so that the movement of the lead wire in the axial direction is limited to a given degree. By virtue of the regulation portion, the lead wire does not interfere with the electronic components mounted on the main board or prevent the rotation of the indicating needle even when the rotation of the substrate causes the movement of the lead wire.

BRIEF DESCRIPTION OF THE DRAWINGS

In order that the present invention can be fully understood, a preferred embodiment thereof will be described with reference to the accompanying drawings, in which.

DETAILED DESCRIPTION OF THE PREFERRED EMBODIMENT

Figure 1:
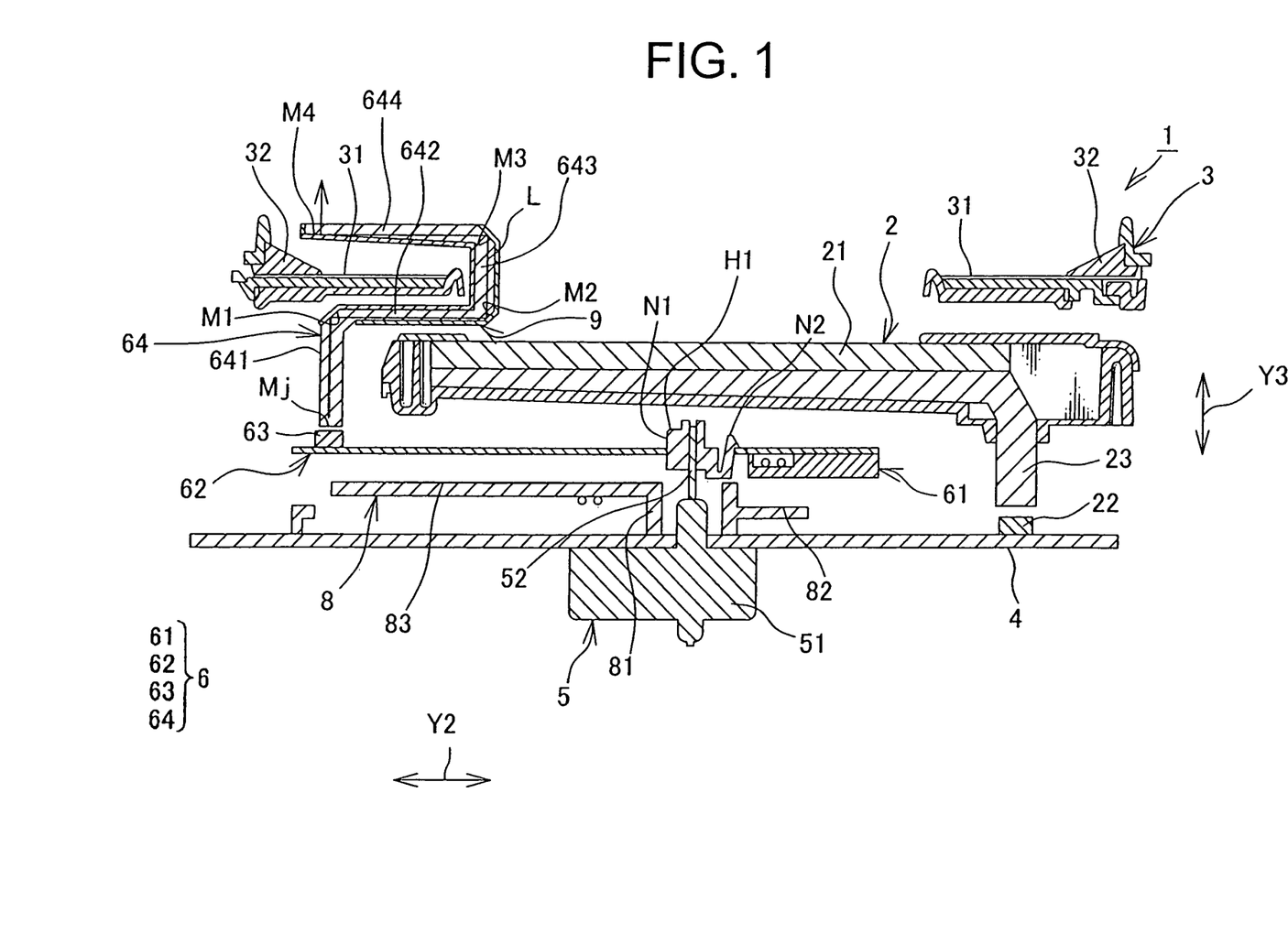
FIG. 1 is a cross-sectional view of a display unit according to one embodiment of the present invention.
Figure 2:
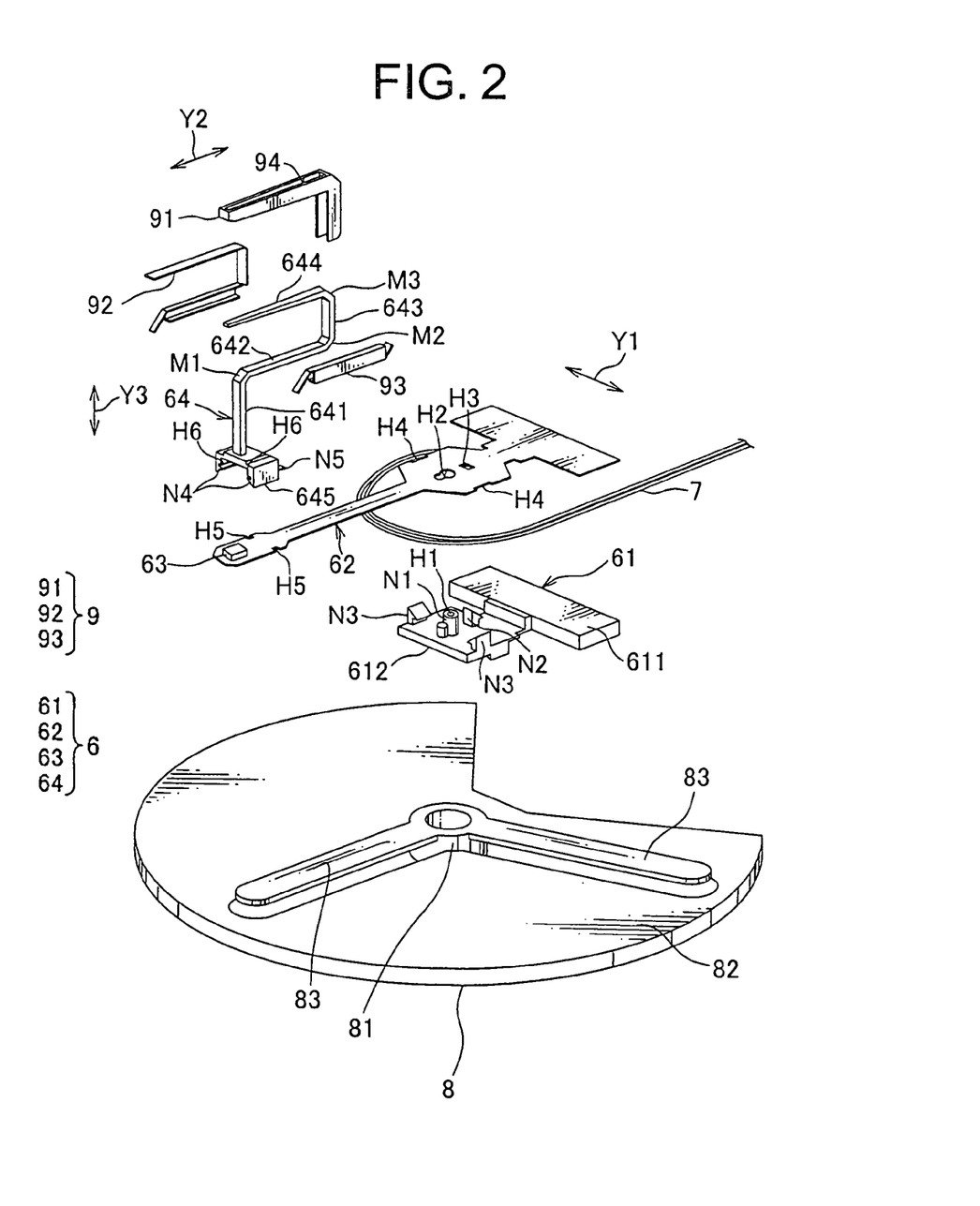
FIG. 2 is a partly exploded perspective view of the display unit shown in FIG. 1.
Figure 3:
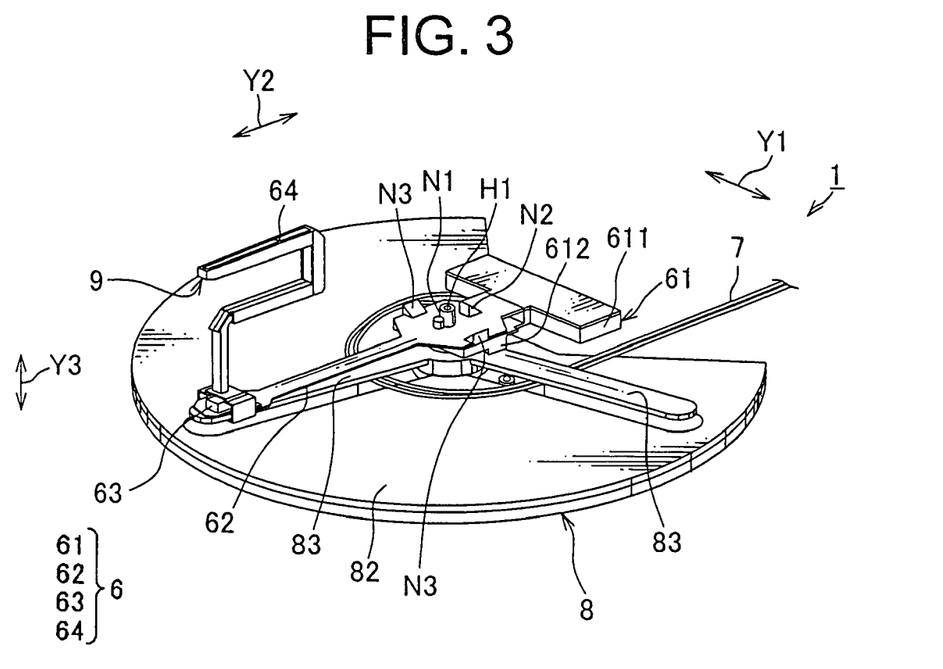
FIG. 3 is a partly exploded perspective view of the display unit shown in FIG. 1.

With reference to FIGS. 1 to 3, and in particular with reference to FIG. 1, there is shown a display unit 1 in accordance with a preferred embodiment of the present invention. The display unit 1 includes an display device, which is, but not limited to, a liquid crystal display (LCD) device 2, a dial assembly 3, a main board 4, a motor 5, an indicating needle 6, a lead wire 7, and a regulation portion 8.

Referring to FIG. 1, the LCD device 2 may be formed in a substantially circular shape and is used to indicate information such as warning and current time. The LCD device 2 includes a body 21, an LED light source 22 for backlighting, which is provided on the main board 4, and a light-guiding plate 23 that guides light beams emitted by the LED light source 22 to an underside of the body 21 of the LCD device 2.

As shown in FIG. 1, the dial assembly 3 has a dial 31 and a ring-shaped scale portion 32. The dial 31 is formed in a shape of a ring or a doughnut (which may be an arc) with a large and substantially circular hole being formed at the central region thereof. Numerals, letters, or other signs that the indicating needle 6 points at are provided on the dial 31 by printing or using other suitable techniques. The ring-shaped scale portion 32 is a light-guiding plate made for example of transparent synthetic resin. The ring-shaped scale portion 32 overlaps and covers the periphery of the dial 31. An engraved scale is provided on the surface of the scale portion 32. The dial assembly 3 is arranged on the front side of the LCD device 2, so that the LCD device 2 can be viewed via the hole of the dial 31.

It should be noted that three directions are identified in the figures. The first direction Y1 is a width direction which is generally parallel to the widths of the balance weight 61 and the substrate 62. The second direction Y2 is a radial direction. The term "radial" or "radially" describes a direction generally parallel to or along a radius of the body 82. Also, the radial direction Y2 is also generally parallel to the length of the substrate 62 in FIG. 1. Further, the radial direction Y2 is orthogonal to the above-defined width direction Y1. The third direction Y3 is an axial direction. The axial direction Y3 is the vertical direction in the figures and is orthogonal to the directions Y1 and Y2. Note that the term "axial" or "axially" describes a direction generally parallel to the shaft 52. Also, "circumferentially" describes a direction generally along a circumference of either of the dial, the dial assembly, or the LCD device depending upon the context. Nonetheless, these components do not need to be circular in a strict sense and instead may take any other suitable shape.

It is appreciated that, since the needle is configured to turn about an axis of rotation (i.e., the shaft), definition of the directions is made based on the static illustration shown in FIG. 1 for convenience of explanation and is in no way intended to limit the technical features of the present invention.

The main board 4 is provided underneath the LCD device 2. The motor 5 has a motor body 51 and a shaft 52. The motor body 51 is provided on an underside of the main board 4. The shaft 52 protrudes from upper surface of the main board 4.

The indicating needle 6 includes a balance weight 61, an elongated substrate 62, and an LED light source 63 (as a light source of the appended claims), and a light guide 64. As shown in FIG. 2, the balance weight 61 includes a weight body 611 and a fixing member 612 that are made in one piece with the body 611. The weight body 611 is a weight used to offset the weight of the substrate 62, the LED light source 63 and the light guide 64 acting upon the shaft 52. The fixing member 612 secures the balance weight 61 and the substrate 62 to the shaft 52.

The fixing member 612 has a positioning protrusion N1, an engagement nail N2, and a pair of engagement nails N3. The positioning protrusion N1 is provided on the surface of the fixing member 612. The positioning protrusion N1 protrudes vertically to have a height larger than those of the engagement nails N2 and N3. The positioning protrusion N1 has a hole H1 into which the shaft 52 is press-fitted. The balance weight 61 is secured to the shaft 52 press-fitted into the hole H1. Also, the positioning protrusion N1 is brought into engagement with a positioning hole H2 of the substrate 62 (to be later described).

The engagement nail N2 is protrudingly provided on the surface of the fixing member 612. The engagement nail N2 is closer to the weight body 611 than the positioning protrusion N1 is. The engagement nail N2 is inserted into an engagement hole H3 of the substrate 62 to be brought into contact and engagement with an edge of the engagement hole H3.

The pair of engagement nails N3 are protruding provided on the surface of the fixing member 612 such that the positioning protrusion N1 resides between the nails N3 in the width direction Y1. The pair of engagement nails N3 are each brought into engagement with an edge of a pair of notches H4 formed at both edges of the substrate 62 in the width direction Y1.

More specifically, the substrate 62 is a hard printed circuit board such as paper-phenol board and glass composite board to which the LED light source 63 is mounted. Although the substrate 62 is preferably a double-sided board for prevention of thermal deformation, but an inexpensive single-sided board may also be suitable when considering cost-reduction options. A film (not shown) such as thermoset curable and plating may be provided on an edge face (i.e., a side surface) of the substrate 62 so as to prevent thermal deformation of the substrate 62.

The substrate 62 extends from the shaft 52 in a radial direction Y2 and substantially in parallel to and beneath the underside of the LCD device 2, reaching a space more radially outward than the end of the LCD device 2. As shown in FIG. 2, the substrate 62 has the positioning hole H2, the engagement hole H3, and the notch H4. Positioning of the balance weight 61 and the substrate 62 is achieved by the positioning protrusion N1 in engagement with the positioning hole H2. After the positioning is completed, the engagement nail N2 engages the edge of the engagement hole H3, so that the engagement nails N3 are engaged with the notch H4. Thus, the substrate 62 is secured via the balance weight 61 to the shaft 52.

Also, a pair of positioning notches H5 are formed at both edges (in the width direction Y1) of a tip of the elongated substrate 62. The positioning notches H5 define the position where the light guide 64 is attached to the substrate 62. As shown in FIG. 1, the LED light source 63 is mounted on a region of the front surface of the substrate 62 so as to reside underneath the underside of the dial assembly 3 and more radially outward of the shaft 52 than the end of the LCD device 2 is.

The light guide 64 is made of a light-guiding material such as transparent synthetic resin and constituted by a first light-guide portion 641, a second light-guide portion 642, a third light-guide portion 643, a needle portion 644, and a fixing member 645.

The geometry of the light guide 64 can be summarized as follows with reference to FIGS. 1 and 2: The first light-guide portion 641 extends in the axial direction Y3 from above the front face of the LED light source 63, along the lateral side of the LCD device 2, and past the level of the front surface of the LCD device 2, and then continues to one end of the second light-guiding portion 642. Second, the second light-guide portion 642 extends from an end of the first light-guide portion 641 in the radial direction Y2 past the inner periphery of the dial 31 to be exposed to an outside via the substantially circular hole of the dial 31, with the other end of the second light-guiding portion 642 continuing to one end of the third light-guide portion 643. Next, the third light-guide portion 643 extends in the axial direction Y3 from the other end of the second light-guide portion 642 and past the level of the dial assembly 3, with the other end of the third light-guide portion 643 continuing to one end of the needle portion 644. Finally, the needle portion 644 is provided from the other end of the third light-guide portion 643 in the axial direction Y3 reaching the space above the dial assembly 3.

The other end of the first light-guide portion 641 and the one end of the second light-guide portion 642 constitute a first connecting portion. Likewise, the other end of the second light-guide portion 642 and one end of the third light-guide portion 643 constitute a second light-guide portion. Further, the other end of the third light-guide portion 643 and one end of the needle portion 644 constitute a third connecting portion. It should be noted that, since the first to third light guide portions and the needle portion 644 are made in one piece with each other to form the light guide 64, the above terminology is only used in the embodiment for convenience of explanation.

The light guide 64 has a first reflecting surface M1, a second reflecting surface M2, a third reflecting surface M3, and an indicating needle's reflecting surface M4. As shown in FIG. 1, the first reflecting surface M1 is provided at the first connecting portion so as to be opposed to a light-entrance surface Mj in the axial direction Y3. The light L traveling through the first light-guide portion 641 in the axial direction Y3 is reflected by the first reflecting surface M1 and the reflected light L then travels inside of the second light-guide portion 642 in the radial direction Y2, and is guided in the second light-guide portion 642. In order to achieve the reflection and guiding, a cross section of the first reflecting surface M1 slopes upward from left to right in FIG. 1.

The second reflecting surface M2 is provided at the second connecting portion so as to be opposed to the first reflecting surface M1 in the radial direction Y2. The reflected light L that travels inside of the second light-guide portion 642 in the radial direction Y2 is again reflected by the second reflecting surface M2 and the twice-reflected light travels now upward in the axial direction Y3 through the third light-guide portion 643. A cross section of the second reflecting surface M2 slopes upward from left to right in FIG. 1.

The third reflecting surface M3 is provided at the third connecting portion so as to be opposed to the second reflecting surface M2 in the axial direction Y3. The twice-reflected light L traveling inside of the third light-guide portion 643 upward in the axial direction Y3 is further reflected by the third reflecting surface M3 and the thrice-reflected light L travels in the radial direction Y2 through the needle portion 644. As shown in FIG. 1, a cross section of the third reflecting surface M3 slopes upward from right to left. The indicating needle's reflecting surface M4 is provided on the back surface of the needle portion 644. As shown in FIG. 1, the reflecting surface M4 moderately slopes upward from right to left in the radial direction Y2, The light traveling inside of the needle portion 644 in the radial direction Y2 is reflected by the reflecting surface M4, so that the four-times-reflected light beams exit the needle portion 644 through the front surface of the needle portion 644.

Restated, the light L emitted by the LED light source 63 enters the light-entrance surface Mj and travels inside of the light guide 64 over multiple times of reflection. More specifically, the Light L that travels inside of the first light-guide portion 641 in the axial direction Y3 is reflected by the first reflecting surface M1. The light L that further travels inside of the second light-guide portion 642 in the radial direction Y2 is reflected by the second reflecting surface M2. The light L that travels inside of the third light-guide portion 643 in the axial direction Y3 is reflected by the third reflecting surface M3. The light L that travels inside of the needle portion 644 in the radial direction Y2 is reflected by the indicating needle's reflecting surface M4, and the light L exits out of the front surface of the needle portion 644. Thus, when viewed by a driver, the front surface of the needle portion 644 is illuminated as if the needle portion 644 itself emits light.

The fixing member 645 is integrally provided on one end of the first light-guide portion 641, the one end facing the LED light source 63 in the axial direction Y3.

As shown in FIG. 2, the fixing member 645 includes a pair of nails N4, a slide groove H6, and a positioning protrusion N5. The pair of nails N4 protrude downward such that the light-entrance surface Mj is placed between the nails N4 in the width direction Y1. Restated, the pair of nails N4 are configured to sandwich the both ends (in the width direction Y1) of the substrate 62.

The slide grooves H6 are formed on the inner surfaces of the nails N4 and extends in the radial direction Y2. The both edges (in the width direction Y1) of the substrate 62 can be slidably inserted into the slide grooves H6, respectively.

The positioning protrusion N5 is configured to be brought into engagement with the positioning notch H5 provided on the substrate 62 so that the position of the light guide 64 on the substrate 62 in the radial direction Y2 is defined and adjusted.

To be more specific, the both edges of the substrate close to the tip of the substrate 62 are inserted into the slide grooves H6, and the light guide 64 is slid until the positioning protrusion N5 is brought into engagement with the positioning notch H5. It is appreciated that what should be done to attach the light guide 64 to the substrate 62 is just bring the positioning protrusion N5 into engagement with the positioning notch H5.

Preferably, the light guide 64 includes a light-guide cover 9 for prevention of leakage of light traveling inside of the light guide 64. The cover 9 covers the surface of the light guide 64 except for the top surface of the needle portion 644. As shown in FIG. 2, the light-guide cover 9 includes a first cover 91, a second cover 92, and a third cover 93. The first cover 91 is configured to cover both sides (in the width direction Y1) of the needle portion 644 along a length thereof, front surface (in the radial direction Y2) of the needle portion 644, both sides (in the width direction Y1) of the third light-guide portion 643, and the back surface (in the radial direction Y2) of the third light-guide portion 643.

An opening 94 of the first cover 91 coincides with the top surface of the needle portion 644 so that the top surface of the needle portion 644 is exposed outside of the light-guide cover 9. Accordingly, the top surface of the needle portion 644 remains exposed outside of the light-guide cover 9 even when the first cover 91 is attached to the light guide 64.

The second cover 92 is configured to cover the indicating needle's reflecting surface M4, one side of the third light-guide portion 643 in the radial direction Y2, the halves (split in the width direction Y1) of an upper side and a lower side of the second light-guide portion 642, and one half (split in the width direction Y1) of the first reflecting surface M1, and one side (in the width direction Y1) of the second light-guide portion 642.

The third cover 93 is configured to cover the other halves of the upper side and lower side of the second light-guide portion 642 and the other half of the first reflecting surface M1, the other side of the second light-guide portion 642, and the second reflecting surface M2.

Preferably, bodies of the first cover 91, the second cover 92, and the third cover 93 may each be made of a white material (not shown), and a black coatings (not shown) may be applied on the outer surfaces of the bodies. The black outer surfaces of the first cover 91, the second cover 92, and the third cover 93 may be formed by, but not limited to, applying black coating medium on the outer surface of the white bodies. Alternatively, double-molding (or coinjection-molding) techniques may be used to mold the white body and the black outer surface with two dissimilar materials or material of different colors. An advantage of the light-guide cover 9 having the black outer surface is that the leakage of light out of the surface of the light guide 64 is effectively prevented while allowing the light to exit the top surface of the needle portion 644 only and as a result the appearance of illumination of the needle portion 644 can be improved.

Also, an advantage of the light-guide cover 9 having the white body is that the light that may leak out of the light-guide cover 9 is reflected off the white body and the reflected light is again guided through the light guide 64 to the needle portion 644. Accordingly, by virtue of the white body of the cover 9, brightness of luminescence on the top surface of the needle portion 64 can be further improved. At the same time, by virtue of the black outer surface, the light that may pass the white body of the light-guide cover 9 to an outside is absorbed by the black surface, and thus the leakage of light is effectively prevented.

The lead wire 7 is a wire for power supply that connects the substrate 62 (at a region close to the shaft 52) and the main board 4. By virtue of the lead wire 7, power can be supplied from the main board 4 to the substrate 62 even without being affected by rotation and a rotation angle of the substrate 62.

The regulation portion 8 is provided between the main board 4 and the substrate 62. The regulation portion 8 is constituted by a cylindrical portion 81, a body 82, and a pair of arms 83. These components of the regulation portion 8 are formed in one piece with each other.

The cylindrical portion 81 is formed in a shape of a cylinder into a throughhole of which the shaft 52 is inserted. The body 82 is formed in a shape of a disk having a relatively large notch. The notch at its deepest portion is closest to the cylindrical portion 81. The pair of arms 83 are formed on the body 82 such that the arms 83 are raised with respect to the upper surface of the body 82 and accordingly closer to the substrate 62 than the body 82 is. The arms 83 continue to the cylindrical portion 81 and extend radially outward of the body 82. Two throughholes are defined by the body 82 and the arms 83 (see FIG. 3), through which the lead wire is passed.

As shown in FIG. 3, the lead wire 7 approaching the space above the body 82 in the radial direction Y2 is inserted into the space between the arm 83 and the body 82. More specifically, the lead wire 7 is sandwiched by the body 82 and the arm 83 in the axial direction Y3, so that movement of the lead wire 7 in the axial direction Y3 is limited to an allowable degree. By virtue of the regulation portion 8, the lead wire 7 does not interfere with the electronic components mounted on the main board 4 or prevent the rotation of the indicating needle 6 even when the rotation of the substrate 62 causes the movement of the lead wire 7.

Advantages of the display unit 1 that are not explicitly discussed in the foregoing or should be emphasized for their importance include, but not limited to, those that follow.

An advantage of the invention is that, by virtue of (a) the light guide 64 including the first light-guide portion 641, the second light-guide portion 642, the third light-guide portion 643, and the needle portion 644, the third light-guide portion 643 in the axial direction Y3 in combination with (b) the LED light source 63 mounted on the tip of the elongated substrate 62 secured to the shaft 52, the LED light source 63 is turned in synchronization with turning of the indicating needle 6, and thus the irregularity in luminance of the needle portion 644 while turning can be eliminated.

Another advantage is that, since the light incoming from the LED light source 63 into the light guide 64 is reflected and guided by only three reflecting surfaces, i.e., the first, the second, and the third reflecting surfaces M1 to M3 before entering the needle portion 644, the number of times of reflection during turning of the indicating needle 6 can be reduced from conventional five (5) to three (3), and thus the brightness of illumination of the needle portion 644 can be increased.

Although the light guide 64 can be readily secured to the substrate 62 by virtue of the fixing member 645 including the nail N4 and the slide groove H6, it will be appreciated that the light guide 64 may be secured to the substrate 62 in a suitable manner other than that described in the preferred embodiment.

Further, the light-guide cover 9 also contributes to improved quality of appearance of the indicating needle 6 and the regulation portion 8 sees to it that the turning of the indicating needle is not compromised due to existence and movement of the lead wire 7, but as will be appreciated from the foregoing, it is possible that the light-guide cover 9 and the regulation portion 8 are omitted.

Also, the regulation portion 8 that regulates the movement of the lead wire 7 in the axial direction Y3 is constituted by the regulation portion body 82 with a circular shape and the arm 83, but the geometry of the regulation portion 8 may be other than that described in the preferred embodiment insofar as the arrangement and movement of the lead wire 7 in the axial direction Y3 can be regulated so that the lead wire does not interfere with the turning of the indicating needle 6.

Having fully described the preferred embodiment of the present invention, it is clear that the descriptions and explanation contained herein are only cited by way of example rather than limitation, and therefore the present invention can be effectuated with modification and variation without departing from the scope and sprit of the present invention, it being recognized that the scope of this invention is only defined and limited by the claims that follow.

Having thus described our invention, what we claim and desire to secure by Letters Patent is as follows:

1. A display unit comprising:
  a doughnut-shaped dial having a substantially circular hole at the center thereof;
  a circular display device provided beneath the dial, a front surface of the display device being viewable via the hole of the dial with marginal area of the front surface of the display device covered by the dial; and
  an indicating needle that turns about a shaft provided beneath the display device, the indicating needle including:
    (a) an elongated substrate that extends beneath the display device in a radial direction with respect to the shaft, with one end secured to the shaft and with the other end reaching a space more outward in the radial direction than an edge of the display device;
(b) a light source provided on a portion of the substrate, the portion being more outward in the radial direction than the edge of the display device; and
(c) a light guide including
a first light-guide portion extending upward in an axial direction with respect to the shaft, past the edge of the display device, with one end thereof facing a surface of the light source and with the other end thereof reaching a space higher in the axial direction than the display device,
a second light-guide portion extending inward in the radial direction with one end thereof continuing to the other end of the first light-guide portion and the other end thereof residing above the display unit and more inward in the radial direction than an inner periphery of the dial,
a third light-guide portion extending upward in the axial direction with one end thereof continuing to the second light-guide portion and with the other end thereof reaching a space higher than the dial, and
a needle portion extending outward in the radial direction with one end thereof continuing to the other end of the third light-guide portion and the other end thereof residing above the dial so that the dial is pointed to by the other end of the needle portion.

2. The display unit as set forth in claim 1, wherein a film that prevents thermal deformation of the substrate is provided on a side surface of the substrate.

3. The display unit as set forth in claim 2, wherein the light guide includes
a first reflecting surface provided at a first connecting portion between the first light-guide portion and the second light-guide portion such that a light emitted by the light source and traveling inside of the first light-guide portion is reflected off the first reflecting surface and the reflected light further travels inside of the second light-guide portion,
a second reflecting surface provided at a second connecting portion between the second light-guide portion and the third light-guide portion such that the light traveling inside of the second light-guide portion is reflected off the second reflecting surface and the reflected light further travels inside of the third light-guide portion, and
a third reflecting surface provided at a third connecting portion between the third light-guide portion and the needle portion such that the light traveling inside of the third light-guide portion is reflected off the third reflecting surface and the reflected light further travels inside of the needle portion toward the other end of the needle portion.

4. The display unit as set forth in claim 3, wherein the light guide further includes in one piece therewith a fixing member having a pair of nails provided at one end of the first light-guide portion facing the light source such that the both edges of the substrate are clamped by the pair of nails in a width direction, and a pair of slide grooves into which the both edges of the substrate are slidably inserted, the slide grooves being formed on inner surfaces of the pair of nails.

5. The display unit as set forth in claim 4, further comprising a light-guide cover configured to cover outer surfaces of the light guide except for a top surface of the needle portion so as to prevent leakage of light.

6. The display unit as set forth in claim 5, wherein the light-guide cover includes a white body made of a white material, and an outer surface of the white body is made of a black material.

7. The display unit as set forth in claim 6, further comprising a main board provided beneath the substrate of the indicating needle and a lead wire for power supply connecting the substrate to the main board.

8. The display unit as set forth in claim 7, further comprising a regulation portion that is provided beneath the underside of the substrate of the indicating needle and on the upper surface of the main board and is configured to sandwich the lead wire in the axial direction such that the movement of the lead wire in the axial direction is limited.

* * * * *